United States Patent
Otaki et al.

(10) Patent No.: US 11,967,715 B2
(45) Date of Patent: Apr. 23, 2024

(54) ACTIVE MATERIAL, ANODE LAYER, BATTERY, AND METHODS FOR PRODUCING THESE

(71) Applicant: TOYOTA JIDOSHA KABUSHIKI KAISHA, Toyota (JP)

(72) Inventors: Mitsutoshi Otaki, Susono (JP); Jun Yoshida, Mishima (JP); Kazuhiro Suzuki, Hadano (JP); Masanori Harata, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 354 days.

(21) Appl. No.: 17/210,746

(22) Filed: Mar. 24, 2021

(65) Prior Publication Data

US 2021/0391576 A1 Dec. 16, 2021

(30) Foreign Application Priority Data

Mar. 27, 2020 (JP) .................................. 2020-058540

(51) Int. Cl.
 *H01M 4/58* (2010.01)
 *H01M 4/02* (2006.01)
 *H01M 4/04* (2006.01)

(52) U.S. Cl.
 CPC .......... *H01M 4/58* (2013.01); *H01M 4/0495* (2013.01); *H01M 2004/027* (2013.01)

(58) Field of Classification Search
 CPC . H01M 4/58; H01M 4/0495; H01M 2004/027
 See application file for complete search history.

(56) References Cited

U.S. PATENT DOCUMENTS

| 2012/0021283 A1 | 1/2012 | Chan et al. |
| 2015/0376016 A1 | 12/2015 | Krishna et al. |
| 2015/0380724 A1* | 12/2015 | Chan ..................... H01M 4/131 429/50 |
| 2018/0323631 A1 | 11/2018 | Otaki et al. |
| 2020/0020929 A1 | 1/2020 | Yoshida et al. |
| 2020/0176768 A1 | 6/2020 | Kosaka et al. |

FOREIGN PATENT DOCUMENTS

| JP | 2017-59534 A | 3/2017 |
| JP | 2020-017513 A | 1/2020 |
| JP | 2020-87886 A | 6/2020 |

OTHER PUBLICATIONS

Li, Xuemin, et al. "Electrochemical Properties and Challenges of Type II Silicon Clathrate Anode in Sodium Ion Batteries." Journal of The Electrochemical Society 166.13 (2019): A3051. (Year: 2019).*

(Continued)

*Primary Examiner* — Milton I Cano
*Assistant Examiner* — Mary G Henshaw
(74) *Attorney, Agent, or Firm* — Oliff PLC

(57) ABSTRACT

A main object of the present disclosure is to provide an active material wherein a volume variation due to charge/discharge is small. The present disclosure achieves the object by providing an active material comprising a silicon clathrate II type crystal phase, and having a composition represented by $Na_xSi_{136}$, wherein $1.98<x<2.54$.

14 Claims, 3 Drawing Sheets

Silicon clathrate II type

Diamond type silicon

(56) References Cited

OTHER PUBLICATIONS

Dopilka, Andrew, et al. "Electrochemical Lithium Alloying Behavior of Guest-Free Type II Silicon Clathrates." The Journal of Physical Chemistry C 125.35 (2021): 19110-19118.) (Year: 2021).*
"Formation of Type II Silicon Clathrate with Lithium Guests through Thermal Diffusion" Yinan Liu, Joseph P. Briggs, Ahmad A. A. Majid, Thomas E. Furtak, Michael Walker, Meenakshi Singh, Carolyn A. Koh, P. Craig Taylor, and Reuben T. Collins, Inorganic Chemistry 2023 62 (18), 6882-6892 (Year: 2021).*
"Silicon clathrates as anode materials for lithium ion batteries?" Jianjun Yang and John S. Tse, J. Mater. Chem. A, 2013, 1, 7782-7789 (Year: 2013).*

* cited by examiner

FIG. 1A

Silicon clathrate II type

FIG. 1B

Diamond type silicon

ACTIVE MATERIAL, ANODE LAYER, BATTERY, AND METHODS FOR PRODUCING THESE

TECHNICAL FIELD

The present disclosure relates to an active material, an anode layer, a battery, and methods for producing these.

BACKGROUND ART

In recent years, development of batteries has been actively undergone. For example, in automobile industries, the development of a battery to be utilized for an electronic vehicle or a hybrid vehicle has been advanced. Also, as an active material used in the battery, Si has been known.

For example, Patent Literature 1 discloses an all solid state battery system including an alloy based anode active material particle such as a silicon particle. Meanwhile, Patent Literature 2 discloses that a silicon clathrate may be calculatory used as an anode active material of a lithium ion battery.

CITATION LIST

Patent Literatures

Patent Literature 1: Japanese Patent Application Laid-Open (JP-A) No. 2017-059534
Patent Literature 2: US Patent Application Laid-Open No. 2012/0021283 Specification

SUMMARY OF DISCLOSURE

Technical Problem

The theoretical capacity of Si is large, which is advantageous in high energy condensation of a battery. On the other hand, the volume variation of Si is large during charge/discharge.

The present disclosure has been made in view of the above circumstances, and a main object of the present disclosure is to provide an active material wherein a volume variation due to charge/discharge is small.

Solution to Problem

In order to achieve the object, the present disclosure provides an active material comprising a silicon clathrate II type crystal phase, and having a composition represented by $Na_xSi_{136}$, wherein $1.98<x<2.54$.

Also, the present disclosure provides an anode layer comprising the above described active material.

Also, the present disclosure provides a battery comprising a cathode layer, an anode layer, and an electrolyte layer formed between the cathode layer and the anode layer, and the anode layer is the above described anode layer.

Also, the present disclosure provides a method for producing an active material, the method comprising: a preparing step of preparing an intermediate including a silicon clathrate II type crystal phase and having a composition represented by $Na_ySi_{136}$, wherein $8 \leq y \leq 21$, an alloying step of obtaining an alloy compound by alloying the intermediate and a Li based material, a Li removing step of removing Li from the alloy compound and obtaining a porous compound including a void inside a primary particle, and a Na removing step of removing Na from the porous compound.

Also, the present disclosure provides a method for producing an anode layer, the method comprising: an active material producing step of producing an active material by the above described method for producing an active material, and an anode layer forming step of forming an anode layer using the active material.

Also, the present disclosure provides a method for producing a battery, the method comprising: an active material producing step of producing an active material by the above described method for producing an active material, and an anode layer forming step of forming an anode layer using the active material.

Advantageous Effects of Disclosure

The present disclosure exhibits effects such that an active material wherein a volume variation due to charge/discharge is small, may be obtained.

DESCRIPTION OF EMBODIMENTS

The active material, the anode layer, the battery, and the methods for producing these in the present disclosure are hereinafter described in detail.

A. Active Material

The active material in the present disclosure comprises a silicon clathrate II type crystal phase, and having a composition represented by $Na_xSi_{136}$, wherein $1.98<x<2.54$.

Figure 1A:
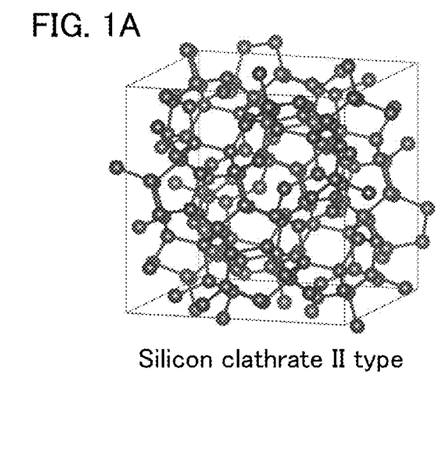
FIGS. 1A and 1B are schematic perspective views illustrating a Si crystal phase.

The active material in the present disclosure comprises a silicon clathrate II type crystal phase. In the silicon clathrate II type crystal phase, as shown in FIG. 1A, a polyhedron (cage) including a pentagon or a hexagon is formed with a plural of Si elements. This polyhedron has a space within thereof that is capable of including a metal ion such as a Li ion. By a metal ion being intercalated into this space, the volume variation due to charge/discharge may be suppressed. In an all solid state battery, particularly, a high confining pressure is generally needed to be applied in order to suppress the volume variation due to charge/discharge. However, the confining pressure may be reduced by using the active material in the present disclosure; as the result, an enlargement of a confining jig may be suppressed.

Figure 1B:
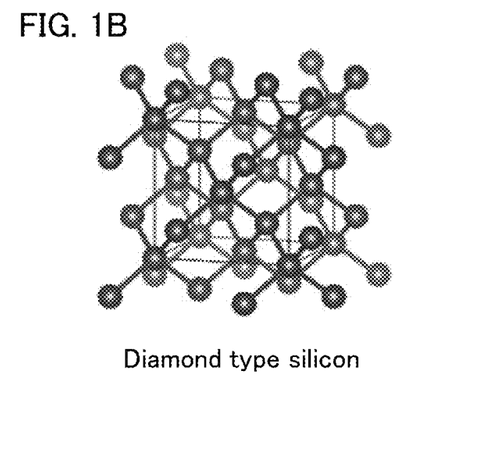

Meanwhile, a usual Si includes a diamond type crystal phase. In the diamond type Si crystal phase, as shown in FIG. 1B, a tetrahedron is formed with a plural of Si elements. Since the tetrahedron does not have a space within thereof that is capable of including a metal ion such as a Li ion, the volume variation due to charge/discharge is hardly suppressed. Therefore, the durability is likely to be deteriorated.

Also, the active material in the present disclosure has a predetermined composition. It is presumed that, by the presence of Na in the active material, the structural stability of the silicon clathrate II type crystal phase (particularly the cage) was improved, as the result, an active material wherein a volume variation due to charge/discharge is small, was obtained.

The active material in the present disclosure has a composition represented by $Na_xSi_{136}$, wherein $1.98 < x < 2.54$. The "x" may be 2.30 or more, and may be 2.33 or more. Meanwhile, the "x" may be 2.50 or less, and may be 2.43 or less. Incidentally the active material in the present disclosure may include an inevitable component (such as Li). The composition of the active material may be determined by, for example, EDX, XRD, XRF, ICP, and an atomic absorption spectrometry. The composition of other compound may be measured similarly.

The active material in the present disclosure comprises a silicon clathrate II type crystal phase. The silicon clathrate II type crystal phase usually belongs to the space group (Fd-3m). The silicon clathrate II type crystal phase has a typical peak at a position of $2\theta=20.09°$, $21.00°$, $26.51°$, $31.72°$, $36.26°$, and $53.01°$ in X-ray diffraction measurement using a CuKα ray. These peak positions may vary respectively in a range of ±0.50°, may vary in a range of ±0.30°, and may vary in a range of ±0.10°.

The active material in the present disclosure preferably comprises the silicon clathrate II type crystal phase as a main phase. "Comprising the silicon clathrate II type crystal phase as a main phase" indicates that, among the peaks observed in X-ray diffraction measurement, a peak belonging to the silicon clathrate II type crystal phase is the peak with the strongest diffraction intensity. The definition relating "main phase" is similar in other crystal phase.

In the silicon clathrate II type crystal phase, a peak at a position of $2\theta=20.09°±0.50°$ is regarded as peak "A", and a peak at a position of $2\theta=31.72°±0.50°$ is regarded as peak "B". Also, an intensity of the peak "A" is regarded as $I_A$, and an intensity of the peak "B" is regarded as $I_B$. Meanwhile, the maximum intensity in $2\theta=22°$ to $23°$ is regarded as $I_M$. Since a peak of the crystal phase related to Si does not usually appear in the range of $2\theta=22°$ to $23°$, it may be used as a standard.

The value of $I_A/I_M$ is preferably more than 1. When the value of $I_A/I_M$ is 1 or less, it may be determined that the silicon clathrate II type crystal phase is not substantially formed. The value of $I_A/I_M$ is, for example, more than 1.02, may be 1.10 or more, may be 1.20 or more, and may be 1.25 or more. The upper limit of the value of $I_A/I_M$ is not particularly limited (for example, value of $I_A/I_M$ may be 1000 or more in some cases). Incidentally, considering the results of the Examples described later, the value of $I_A/I_M$ may be, for example, 10 or less, and may be 5 or less.

The value of $I_B/I_M$ is preferably more than 1. When the value of $I_B/I_M$ is 1 or less, it may be determined that the silicon clathrate II type crystal phase is not substantially formed. The value of $I_B/I_M$ is, for example, more than 1.03, and may be 1.06 or more. The upper limit of the value of $I_B/I_M$ is not particularly limited (for example, value of $I_B/I_M$ may be 1000 or more in some cases). Incidentally, considering the results of the Examples described later, the value of $I_B/I_M$ may be, for example, 10 or less, and may be 5 or less.

The peak "B" in the silicon clathrate II type crystal phase is preferably located at $31.60° < 2\theta < 31.69°$. As described in Examples below, the stabilization of the cage structure appears in the variation of the peak position of peak "B".

The peak position of the peak "B" may be 31.65° or more. Meanwhile, the peak position of the peak "B" may be 31.69° or less.

Also, the active material in the present disclosure preferably includes no diamond type Si crystal phase; however, it may be slightly included. The diamond type Si crystal phase has a typical peak at a position of $2\theta=28.44°$, $47.31°$, $56.10°$, $69.17°$, and $76.37°$, in an X-ray diffraction measurement using a CuKα ray. These peak positions may be shifted respectively in a range of ±0.50°, may be shifted in a range of ±0.30°, and may be shifted in a range of ±0.10°.

When peak "C" is observed as a peak of the diamond type Si crystal phase at a position of $2\theta=28.44°±0.50°$, an intensity of the peak "C" is regarded as $I_C$. The value of $I_A/I_C$ is, for example, more than 1, may be 1.5 or more, may be 2 or more, and may be 3 or more. The preferable range of $I_B/I_C$ is similar to the preferable range of $I_A/I_C$.

The active material in the present disclosure preferably includes no silicon clathrate I type crystal phase. The silicon clathrate I type crystal phase usually belongs to the space group (Pm-3n). The silicon clathrate I type crystal phase has a typical peak at a position of $2\theta=19.44°$, $21.32°$, $30.33°$, $31.60°$, $32.82°$, $36.29°$, $52.39°$, and $55.49°$ in X-ray diffraction measurement using a CuKα ray. These peak positions may be shifted respectively in a range of ±0.50°, may be shifted in a range of ±0.30°, and may be shifted in a range of ±0.10°. "Including no crystal phase" may be confirmed by the peak of the crystal phase not being confirmed in the X-ray diffraction measurement.

Examples of the shape of the active material in the present disclosure may include a granular shape. The active material may be a primary particle, and may be a secondary particle wherein the primary particles are agglutinated. In either case, the active material preferably includes a void inside the primary particle. This is because the volume variation due to charge/discharge may further be suppressed. As described above, since the silicon clathrate II type crystal phase has a cage capable of including a metal ion such as a Li ion, the volume variation due to charge/discharge may be suppressed. When the primary particle including the crystal phase includes a void inside thereof, since the void also contributes to the suppression of the volume variation, the volume variation due to charge/discharge may further be suppressed.

The active material in the present disclosure preferably includes many minute voids with a fine pore diameter of 100 nm or less. The reason therefor is to suppress the volume variation due to charge/discharge uniformly. The void amount of the void with a fine pore diameter of 100 nm or less is, for example, 0.05 cc/g or more, may be 0.07 cc/g or more, and may be 0.10 cc/g or more. Meanwhile, the void amount is, for example, 0.15 cc/g or less. The void amount may be determined by, for example, a mercury porosimeter measurement, a BET measurement, a gaseous adsorption method, 3D-SEM, and 3D-TEM.

The active material in the present disclosure includes a void inside a primary particle. The void ratio is, for example, 4% or more, and may be 10% or more. Also, the void ratio is, for example, 40% or less, and may be 20% or less. The void ratio may be determined by, for example, the following procedure. First, a cross-section of an electrode layer including an active material is obtained by conducting an ion milling process thereto. Then, the cross-section is observed with a SEM (scanning electron microscope), and a photograph of the particle is taken. In the obtained photograph, the silicon part and the void part are rigidly distinguished and digitalize with an image analyzing software. The areas of the silicon part and the void part are determined, and the void ratio (%) is calculated from the below described formula.

Void ratio (%)=100×(void part area)/((silicon part area)+(void part area))

The specific image analyzing and the calculation of the void ratio may be conducted as described below. As the image analyzing software, for example, Fiji ImageJ bundled with Java 1.8.0_172 (hereinafter, Fiji) is used. The image is colorized into an RGB color image by combining a secondary electron image and a reflection electron image in the same field of view. Then, in order to eliminate the noise of each pixel, the obtained RGB image is blurred with the function of Fiji "Median (filter size=2)". Next, with the function of Fiji "Weka Machine Learning", a plurality of arbitrary regions in the noise eliminated image are specified into the silicon part or the void part respectively by a person, and teaching data wherein the silicon part and the void part are rigidly distinguished are formed. Then, based on the formed teaching data, the silicon part and the void part are discriminated with a machine in Fiji, and the area ratio of the silicon part and the void part is calculated.

In relation to the colorizing into the RGB color image, since both of the secondary electron image and the reflection electron image are displayed in a grayscale, the brightness "x" of each pixel in the secondary electron image is assigned to Red value, and the brightness "y" in the reflection electron image is similarly assigned to Green value, for example. Thereby, each pixel are colorized into an RGB color image as, for example, R=x, G=y, B=(x+y)/2.

The detailed conditions in "Weka Machine Learning" described above will be hereinafter described. As training features (numerical features of an image to be focused by a machine when forming teaching data in a machine learning), Gaussian blur, Hessian, Membrane projections, Mean, Maximum, Anisotropic diffusion, Sobel filter, Difference of gaussians, Variance, Minimum, Median are selected. Also, for other parameters, Membrane thickness is set to 3, Membrane patch size is set to 19, Minimum sigma is set to 1.0, and Maximum sigma is set to 16.0.

The average particle size of the primary particle is, for example, 50 nm or more, may be 100 nm or more, and may be 150 nm or more. Meanwhile, the average particle size of the primary particle is, for example, 3000 nm or less, may be 1500 nm or less, and may be 1000 nm or less. Also, the average particle size of the secondary particle is, for example, 1 μm or more, may be 2 μm or more, and may be 5 μm or more. Meanwhile, the average particle size of the secondary particle is, for example, 60 μm or less, and may be 40 μm or less. Incidentally, the average particle size may be determined by observation with a SEM, for example. The number of the sample is preferably large; for example, 20 or more, may be 50 or more, and may be 100 or more.

For the active material in the present disclosure, peak "X" at a position of 99.2 eV±0.4 eV as a peak of Si(2p) deriving from Si, and peak "Y" at a position of 103.6 eV±0.4 eV as a peak of Si(2p) deriving from $SiO_2$ may be observed in X-ray photoelectron spectroscopy measurement. When an intensity of the peak "X" is regarded as $I_X$, and an intensity of the peak "Y" is regarded as $I_Y$, $I_Y/I_X$ is preferably low. This is because the volume variation due to the silicon oxide may be suppressed. The $I_Y/I_X$ is, for example, 1.30 or less, may be 1.23 or less, and may be 0.81 or less. Meanwhile, the $I_Y/I_X$ is, for example, 0.50 or more, may be 0.70 or more, and may be 0.76 or more.

The active material in the present disclosure is usually used for a battery. The active material in the present disclosure may be an anode active material, may be a cathode active material, and the former is preferable. In the present disclosure, an electrode layer (anode layer or cathode layer) including the above described active material, and a battery including the electrode layer may be provided. Examples of the method for producing an active material may include the method for producing described in "D. Method for producing active material" described later.

B. Anode Layer

The anode layer in the present disclosure includes the above described active material.

According to the present disclosure, by using the above described active material, the anode layer may be an anode layer wherein a volume variation due to charge/discharge is small.

The anode layer is a layer including at least an anode active material. The anode active material may be in the same contents as those described in "A. Active material" above; thus, the description herein is omitted. The proportion of the anode active material in the anode layer is, for example, 20 weight % or more, may be 30 weight % or more, and may be 40 weight % or more. When the proportion of the anode active material is too low, a sufficient energy density may not be obtained. Meanwhile, the proportion of the anode active material is, for example, 80 weight % or less, may be 70 weight % or less, and may be 60 weight % or less. When the proportion of the anode active material is too high, an ion conductivity and an electron conductivity in the anode layer may be reduced, relatively.

The anode layer may include at least one of an electrolyte, a conductive material, and a binder as required. Examples of the electrolyte may include the electrolyte which will be described in "C. Battery, 3. Electrolyte layer" later. Examples of the conductive material may include a carbon material, a metal particle, and a conductive polymer. Examples of the carbon material may include particulate carbon materials such as acetylene black (AB) and Ketjen black (KB); and fibrous carbon materials such as carbon fiber, carbon nanotube (CNT), and carbon nanofiber (CNF). Also, examples of the binder may include rubber-based binders and fluorine-based binders.

The thickness of the anode layer is, for example, 0.1 μm or more and 1000 μm or less. The anode layer in the present disclosure is usually used for a battery.

C. Battery

Figure 2:
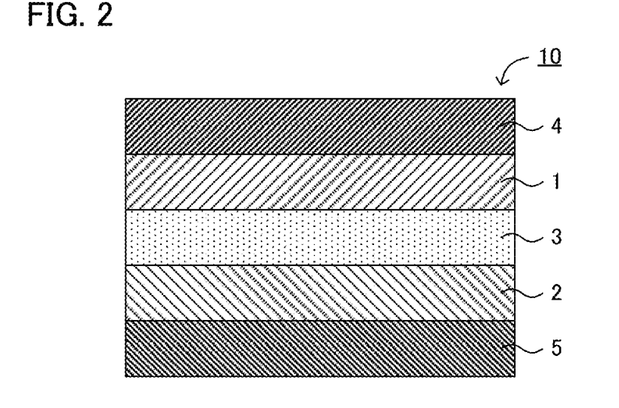
FIG. 2 is a schematic cross-sectional view illustrating an example of a battery in the present disclosure.

FIG. 2 is a schematic cross-sectional view illustrating an example of the battery in the present disclosure. Battery 10 shown in FIG. 2 comprises cathode layer 1, anode layer 2, electrolyte layer 3 formed between cathode layer 1 and anode layer 2, cathode current collector 4 for collecting currents of cathode layer 1, and anode current collector 5 for collecting currents of anode layer 2. In the present disclosure, anode layer 2 is the anode layer described in "B. Anode layer" above.

According to the present disclosure, by using the above described anode layer, the battery may be a battery wherein a volume variation due to charge/discharge is small.

1. Anode Layer

The anode layer in the present disclosure may be in the same contents as those described in "B. Anode layer" above; thus, the description herein is omitted.

2. Cathode Layer

The cathode layer is a layer including at least a cathode active material. Also, the cathode layer may include at least one of an electrolyte, a conductive material, and a binder, as necessary.

Examples of the cathode active material may include an oxide active material. Examples of the oxide active material may include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$, $Li_4Ti_5O_{12}$, and $Li(Ni_{0.5}Mn_{1.5})O_4$; and olivine type active materials such as $LiFePO_4$, $LiMnPO_4$, $LiNiPO_4$, and $LiCoPO_4$.

A coating layer including a Li ion conductive oxide may be formed on the surface of the oxide active material. The reason therefor is to suppress the reaction of the oxide active material with the solid electrolyte (particularly sulfide solid electrolyte). Examples of the Li ion conductive oxide may include $LiNbO_3$. The thickness of the coating layer is, for example, 1 nm or more and 30 nm or less. Also, $Li_2S$ may be used, for example, as the cathode active material.

Examples of the shape of the cathode active material may include a granular shape. The average particle size ($D_{50}$) of the cathode active material is not particularly limited; is, for example, 10 nm or more, and may be 100 nm or more. Meanwhile, the average particle size ($D_{50}$) of the cathode active material is, for example, 50 μm or less, and may be 20 μm or less. The average particle size ($D_{50}$) may be calculated from the measurement by, for example, a laser diffraction type particle size distribution meter, and a scanning electron microscope (SEM).

The electrolyte, the conductive material and the binder used for the cathode layer may be in the same contents as those described in "B. Anode layer" above; thus, the description herein is omitted. The thickness of the cathode layer is, for example, 0.1 μm or more and 1000 μm or less.

3. Electrolyte Layer

The electrolyte layer is a layer formed between the cathode layer and the anode layer, and includes at least an electrolyte. The electrolyte may be a solid electrolyte, and may be an electrolyte solution (liquid electrolyte).

Examples of the solid electrolyte may include inorganic solid electrolytes such as sulfide solid electrolyte, oxide solid electrolyte, nitride solid electrolyte, and halide solid electrolyte; and organic polymer electrolytes such as polymer electrolyte. Examples of the sulfide solid electrolyte may include solid electrolyte including a Li element, an X element (X is at least one kind of P, As, Sb, Si, Ge, Sn, B, Al, Ga, and In) and a S element. Also, the sulfide solid electrolyte may further include at least either one of an O element and a halogen element. Examples of the halogen element may include a F element, a Cl element, a Br element, and an I element. The sulfide solid electrolyte may be a glass (amorphous), and may be a glass ceramic. Examples of the sulfide solid electrolyte may include $Li_2S$—$P_2S_5$, LiI—$Li_2S$—$P_2S_5$, LiI—LiBr—$Li_2S$—$P_2S_5$, $Li_2S$—$SiS_2$, $Li_2S$—$GeS_2$, and $Li_2S$—$P_2S_5$—$GeS_2$.

The liquid electrolyte preferably includes a supporting salt and a solvent. Examples of the supporting salt (lithium salt) of the liquid electrolyte having lithium ion conductivity may include inorganic lithium salts such as $LiPF_6$, $LiBF_4$, $LiClO_4$, and $LiAsF_6$; and organic lithium salts such as $LiCF_3SO_3$, $LiN(CF_3SO_2)_2$, $LiN(C_2F_5SO_2)_2$, $LiN(FSO_2)_2$, and $LiC(CF_3SO_2)_3$. Examples of the solvent used for the liquid electrolyte may include cyclic esters (cyclic carbonates) such as ethylene carbonate (EC), propylene carbonate (PC), and butylene carbonate (BC); and chain esters (chain carbonates) such as dimethyl carbonate (DMC), diethyl carbonate (DEC), and ethylmethyl carbonate (EMC). The liquid electrolyte preferably includes two kinds or more of the solvents.

The thickness of the electrolyte layer is, for example, 0.1 μm or more and 1000 μm or less.

4. Other Constitutions

The battery in the present disclosure preferably comprises a cathode current collector for collecting currents of the cathode layer and an anode current collector for collecting currents of the anode layer. Examples of the materials for the cathode current collector may include SUS, aluminum, nickel, iron, titanium, and carbon. Meanwhile, examples of the materials for the anode current collector may include SUS, copper, nickel, and carbon.

The battery in the present disclosure may further include a confining jig that applies a confining pressure along the thickness direction, to the cathode layer, the electrolyte layer and the anode layer. Particularly, when the electrolyte layer is a solid electrolyte layer, the confining pressure is preferably applied in order to form a favorable ion conductive path and an electron conductive path. The confining pressure is, for example, 0.1 MPa or more, may be 1 MPa or more, and may be 5 MPa or more. Meanwhile, the confining pressure is, for example, 100 MPa or less, may be 50 MPa or less, and may be 20 MPa or less.

5. Battery

The kind of the battery in the present disclosure is not particularly limited; and typically a lithium ion battery. Also, the battery in the present disclosure may be a liquid battery in which a liquid electrolyte is included as the electrolyte layer, and may be an all solid state battery in which a solid electrolyte layer is included as the electrolyte layer. Also, the battery in the present disclosure may be a primary battery and may be a secondary battery; above all, preferably the secondary battery so as to be repeatedly charged and discharged, and be useful as a car-mounted battery, for example.

The battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the battery may include a coin shape, a laminate shape, a cylindrical shape, and a square shape.

D. Method for Producing Active Material

Figure 3:
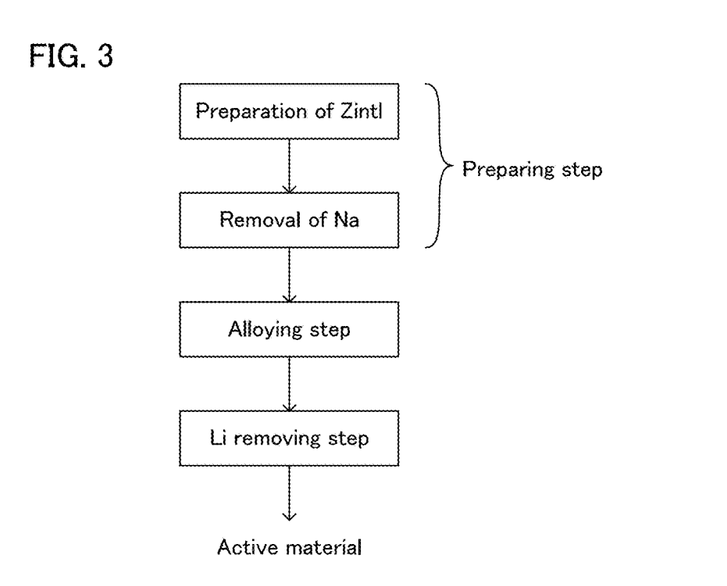
FIG. 3 is a flow chart illustrating an example of the method for producing an active material in the present disclosure.

FIG. 3 is a flow chart illustrating an example of the method for producing an active material in the present disclosure. In the method for producing shown in FIG. 3, a Zintl compound including Na and Si, and including at least a Zintl phase is firstly prepared, and an intermediate including a silicon clathrate II type crystal phase and having a composition represented by $Na_ySi_{136}$, wherein $8 \leq y \leq 21$, is prepared by removing Na from the Zintl compound (preparing step). Then, an alloy compound is obtained by alloying the intermediate and a Li based material (alloying step). Then, Li is removed from the alloy compound and a porous compound including a void inside a primary particle is obtained (Li removing step). Then, Na is removed from the porous compound (Na removing step). Thereby, an active material including a silicon clathrate II type crystal phase may be obtained.

According to the present disclosure, by forming a void inside a primary particle, an active material wherein a volume variation due to charge/discharge is small, may be obtained. Also, an active material wherein a volume variation due to charge/discharge is small, is obtained, since Na included in the cage of the clathrate prevents Li intrusion when Si and Li are alloyed so as to suppress the collapse of the cage, by using the intermediate wherein Na is willingly remained.

1. Preparing Step

The preparing step in the present disclosure is a step of preparing an intermediate including a silicon clathrate II type crystal phase and having a composition represented by $Na_ySi_{136}$, wherein $8 \le y \le 21$. The method for preparing the intermediate is not particularly limited; and examples may include a method wherein Na is removed from a Zintl compound including Na and Si, and including at least a Zintl phase.

(1) Preparation of Zintl

The Zintl compound includes a Zintl phase. The Zintl phase has a typical peak at a position of $2\theta = 16.10°$, 16.56°, 17.64°, 20.16°, 27.96°, 33.60°, 35.68°, 40.22°, and 41.14° in X-ray diffraction measurement using a CuKα ray. These peak positions may vary respectively in a range of ±0.50°, and may vary in a range of ±0.30°. The Zintl compound preferably includes the Zintl phase as a main phase. The Zintl compound may or may not include a silicon clathrate I type crystal phase. Also, the Zintl compound may or may not include a silicon clathrate II type crystal phase.

The composition of the Zintl compound is not particularly limited, and is preferably a composition represented by $Na_zSi_{136}$, wherein $121 \le z \le 151$. The "z" may be 126 or more, and may be 131 or more. Meanwhile, the "z" may be 141 or less.

The Zintl compound may be obtained by, for example, conducting a heat treatment to a raw material mixture including Na (simple substance) and Si (simple substance). The proportion of Na (simple substance) and Si (simple substance) is not particularly limited; to 1 mol part of Si (simple substance), Na (simple substance) is, for example, 0.8 mol parts or more, and may be 1 mol part or more. Meanwhile, to 1 mol part of Si (simple substance), Na (simple substance) is, for example, 1.5 mol parts or less, and may be 1.3 mol parts or less.

The heat treatment temperature is, for example, 500° C. or more and 1000° C. or less. Also, the heat treating time is, for example, 1 hour or more and 50 hours or less. Particularly, it is preferable to conduct the heat treatment under the conditions of approximately 700° C. (such as 650° C. or more and 750° C. or less) and approximately 20 hours (such as 15 hours or more and 25 hours or less).

(2) Removal of Na

Examples of the method for removing Na from the Zintl compound may include a heat treatment. The heat treatment temperature is, for example, 280° C. or more, and may be 300° C. or more. Meanwhile, the heat treatment temperature is, for example, 500° C. or less. The heat treating time is, for example, 1 hour or more and 50 hours or less. The heat treatment may be conducted under ambient pressure atmosphere, and may be conducted under reduced pressure atmosphere. In the latter case, the pressure at the time of heat treatment is, for example, 10 Pa or less, may be 1 Pa or less, and may be 0.1 Pa or less. Also, the heat treatment may be conducted under inert gas atmosphere such as an Ar atmosphere.

(3) Intermediate

The intermediate usually includes a silicon clathrate II type crystal phase. The intermediate preferably includes the silicon clathrate II type crystal phase as a main phase. The intermediate may or may not include a silicon clathrate I type crystal phase. The intermediate preferably includes no diamond type Si crystal phase; however, it may be slightly included. Also, the intermediate has a composition represented by $Na_ySi_{136}$, wherein $8 \le y \le 21$. The "y" may be 10 or more. Meanwhile, the "y" may be 18 or less.

2. Alloying Step

The alloying step in the present disclosure is a step of obtaining an alloy compound by alloying the intermediate and a Li based material.

The Li based material is not particularly limited as long as it capable of being alloyed with the intermediate; it may be a simple substance of Li, and may be a Li alloy. The Li alloy is preferably an alloy including Li as a main component so as to be easily alloyed with the intermediate. Examples of the method for alloying the intermediate and the Li based material may include a method wherein the two are mixed, and a method wherein the two are heat treated.

In the alloying step, the alloying of the intermediate and the Li based material is preferably carried out so as the molar ratio (Li/Si) of Li included in the Li based material to Si included in the intermediate is in a predetermined range. The Li/Si is, for example, 0.5 or more, may be 0.75 or more, and may be 1 or more. When the Li/Si is too low, the void may not be formed inside the primary particle. Meanwhile, the Li/Si is, for example, 3 or less, may be 2.5 or less, and may be 2 or less. When the Li/Si is too high, the silicon clathrate II type crystal phase may not be maintained. Since the crystallinity of Si tends to decrease by alloying with Li, the Li/Si is preferably controlled.

3. Li Removing Step

The Li removing step in the present disclosure is a step of removing Li from the alloy compound and obtaining a porous compound including a void inside a primary particle. By removing the Li included in the alloy compound (highly dispersed Li), a nano sized (nano order) void may be formed.

Examples of the method for removing Li from the alloy compound may include a method wherein the alloy compound is reacted with a Li extracting material. Examples of the Li extracting material may include a liquid. Examples of the Li extracting material may include primary alcohols such as methanol, ethanol, 1-propanol, 1-butanol, 1-pentanol, and 1-hexanol; secondary alcohols such as 2-propanol, 2-butanol, 2-pentanol, and 2-hexanol; tertiary alcohols such as tert-butyl alcohol; phenolics such as phenol; glycols such as 1,2-ethanediol and 1,3-butanediol; glycol ethers such as propylene glycol monomethyl ether and ethylene glycol monomethyl ether; pyranoses such as b-D-glucopyranose; furanoses such as erythrofuranose; glucoses; fructoses; and polysaccharides. The Li extracting material is preferably at least one kind of methanol, ethanol, 1-propanol, 2-propanol, 1-butanol, and 1-hexanol. Particularly, the Li extracting material preferably includes at least ethanol. Also, as the Li extracting material, for example, acids such as acetic acid, formic acid, propionic acid, and oxalic acid may be used. In the present disclosure, two kinds or more of the Li extracting material may be used. In this case, the two kinds or more of the Li extracting material may be used as a mixture, and may be used separately (treatments of two steps or more may be carried out as the Li removal).

The water content of the Li extracting material is preferably low. When the water content is too high, the alloy compound may be deteriorated. The water content in the Li extracting material is, for example, 100 ppm or less, and may be 10 ppm or less.

The method for reacting the alloy compound with the Li extracting material is not particularly limited. The alloy compound may be brought into direct contact with the Li extracting material, and a dispersion wherein the alloy compound is dispersed may be brought into contact with the Li extracting material. Examples of a dispersing medium may include saturated hydrocarbons such as n-heptane, n-octane, n-decane, 2-ethylhexane, and cyclohexane;

unsaturated hydrocarbons such as hexene and heptene; aromatic hydrocarbons such as 1,3,5-trimethylbenzene, toluene, xylene, ethylbenzene, propylbenzene, cumene, 1,2,4-trimethylbenzene, and 1,2,3-trimethylbenzene; and ethers such as n-butylether, n-hexylether, isoamyl ether, diphenylether, methylphenyl ether, and cyclopentylmethyl ether. The specific dielectric constant of the dispersing medium is, for example, 3.08 or less, and may be 3.00 or less. Meanwhile, the specific dielectric constant of the dispersing medium is, for example, 1.50 or more, and may be 1.70 or more. The specific dielectric constant may be measured by, for example, a method described in JIS C 2565 (such as cavity resonator method).

4. Na Removing Step

The Na removing step in the present disclosure is a step of removing the Na from the porous compound.

Examples of the method for removing Na from the porous compound may include a heat treatment. The heat treatment temperature is, for example, 280° C. or more, and may be 300° C. or more. Meanwhile, the heat treatment temperature is, for example, 500° C. or less. The heat treatment time is, for example, 1 hour or more and 50 hours or less. The heat treatment may be conducted under ambient pressure atmosphere, and may be conducted under reduced pressure atmosphere. In the latter case, the pressure at the time of heat treatment is, for example, 10 Pa or less, may be 1 Pa or less, and may be 0.1 Pa or less. Also, the heat treatment may be conducted under inert gas atmosphere such as an Ar atmosphere.

5. Active Material

The active material obtained by each of the above described step comprises a silicon clathrate II type crystal phase. Also, the active material includes a void inside a primary particle. For the preferable range of the composition of the active material, the preferable range of $I_A/I_M$ and $I_B/I_M$, and other matters, the contents described in "A. Active material" above may be appropriately referred.

E. Method for Producing Anode Layer

The present disclosure provides a method for producing an anode layer, the method comprising an active material producing step of producing an active material by the above described method for producing an active material, and an anode layer forming step of forming an anode layer using the active material.

According to the present disclosure, by using the above described active material, an anode layer wherein a volume variation due to charge/discharge is small, may be obtained. The active material producing step may be in the same contents as those described in "D. Method for producing active material" above. Also, the method for forming an anode layer is not particularly limited, and a known method may be adopted. An anode layer formed on an anode current collector may be obtained by, for example, coating the anode current collector with a slurry including at least an active material, and drying thereof. For the preferable embodiment of the obtained anode layer, the contents described in "B. Anode layer" above may be appropriately referred.

F. Method for Producing Battery.

The present disclosure provides a method for producing a battery, the method comprising: an active material producing step of producing an active material by the above described method for producing an active material, and an anode layer forming step of forming an anode layer using the active material.

According to the present disclosure, by using the above described active material, a battery wherein a volume variation due to charge/discharge is small, may be obtained. The active material producing step and the anode layer forming step may be in the same contents as those described in "D. Method for producing active material" and "E. Method for producing anode layer" above. Also, the method for forming a battery is not particularly limited, and a known method may be adopted. Besides the active material producing step and the anode layer forming step, the method for producing a battery in the present disclosure may include the following steps; a cathode layer forming step of forming a cathode layer, an electrolyte layer forming step of forming an electrode layer, and placing step of placing a cathode layer, an electrode layer, and an anode layer in this order. For the preferable embodiment of the obtained battery, the contents described in "C. Battery" above may be appropriately referred.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Synthesis of Active Material>

Si particles and Na particles were mixed so as to be 1:1 in the molar ratio, projected into a melting pot, the pot was sealed under an Ar atmosphere, and heated at 700° C. so as to synthesize NaSi (Zintl compound). Then, under vacuum (approximately 1 Pa), Na was removed by heating for 20 hours at 360° C. so as to obtain an intermediate. The obtained intermediate and metal Li were weighed so as Li/Si=2.5 in molar ratio, and mixed in a mortar under an Ar atmosphere so as to obtain an alloy compound. By reacting the obtained alloy compound with ethanol under an Ar atmosphere, a porous compound including a void inside a primary particle was obtained. After that, an active material was obtained by removing Na by heating for 6 hours at 430° C. under vacuum (approximately 1 Pa).

<Production of Anode>

The obtained active material, a sulfide solid electrolyte ($Li_2S$—$P_2S_5$ based glass ceramic) a conductive material (VGCF), a butyl butyrate solution containing a PVDF-based binder at the ratio of 5 weight % and a butyl butyrate were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 30 minutes. The obtained mixture was pasted on an anode current collector (a Cu foil, from UACJ Corp.) by a blade method using an applicator, dried for 30 minutes on a hot plate adjusted to be 100° C. An anode including an anode current collector and an anode layer was obtained in the above manner.

<Production of Cathode>

A cathode active material ($LiNi_{1/3}Co_{1/3}Mn_{1/3}O_2$, average particle size of 6 μm), a sulfide solid electrolyte ($Li_2S$—$P_2S_5$ based glass ceramic), a conductive material (VGCF), a butyl butyrate solution containing a PVDF-based binder at the ratio of 5 weight % and a butyl butyrate were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 3 minutes. The obtained mixture was pasted on a cathode current collector (an Al foil, from Showa Denko Co., Ltd.) by a blade method using an applicator, dried for 30 minutes on a hot plate adjusted to be 100° C. A cathode including a cathode current collector and a cathode layer was obtained in the above manner. Incidentally, the area of the cathode was made smaller than the area of the anode.

<Production of Solid Electrolyte Layer>

A sulfide solid electrolyte ($Li_2S$—$P_2S_5$ based glass ceramic), a heptane solution containing a butylene rubber based binder at the ratio of 5 weight %, and a heptane were added to a polypropylene container, stirred for 30 seconds with an ultrasonic dispersion apparatus (UH-50, from SMT Corp.). Then, the container was shaken with a shaker (TTM-1, from Sibata Scientific Technology LTD.) for 30 minutes. The obtained mixture was pasted on a release sheet (an Al foil) by a blade method using an applicator, dried for 30 minutes on a hot plate adjusted to be 100° C. A transfer member including the release sheet and a solid electrolyte layer was obtained in the above manner.

<Production of all Solid State Battery>

A solid electrolyte layer for joining was placed on the cathode layer of the cathode, set in a roll press machine, and pressed under 20 kN/cm (approximately 710 MPa) at 165° C. Thereby, a first stacked body was obtained.

Next, the anode was set in a roll press machine, and pressed under 20 kN/cm (approximately 630 MPa) at 25° C. Then, the solid electrolyte layer for joining and the transfer member were placed in this order from the anode layer side. On this occasion, the solid electrolyte layer for joining and the solid electrolyte layer of the transfer member were placed so as to face to each other. The obtained stacked body was set in planner uniaxial press machine, temporary pressed for 10 seconds under 100 MPa at 25° C. Then, the release sheet was peeled off from the solid electrolyte layer. Thereby, a second stacked body was obtained.

Next, the solid electrolyte layer for joining of the first stacked body and the solid electrolyte layer of the second stacked body were placed so as to face to each other, set in planner uniaxial press machine, pressed for 1 minute under 200 MPa at 135° C. Thereby, an all solid state battery was obtained.

Example 2, Comparative Examples 1 and 2

An active material was obtained in the same manner as in Example 1 except that the heat treatment conditions in the first Na removal were changed to the conditions shown in Table 1. An all solid state battery was obtained in the same manner as in Example 1 except that the obtained active material was used.

[Evaluation]

<SEM-EDX Measurement>

A SEM-EDX (scanning electron microscope-energy dispersion type X-ray spectroscope) measurement was carried out for the intermediates and the active materials obtained in Examples 1 and 2 and Comparative Examples 1 and 2. As the result, it was confirmed that a nano-sized void was formed inside the primary particle in the active material obtained in Examples 1 and 2. Also, from the result of EDX, the ratio of Na and Si was determined, and the compositions of the intermediate and the active material were determined. The results are shown in Table 1.

TABLE 1

| | Na removal (first time) | Intermediate composition y in $Na_ySi_{136}$ | Li/Si | Na removal (second time) | Active material composition x in $Na_xSi_{136}$ |
|---|---|---|---|---|---|
| Comp. Ex. 1 | 300° C., 20 h 430° C., 3 h | 3.09 | 2.5 | 430° C., 6 h | 1.98 |
| Example 1 | 360° C., 20 h | 10.36 | 2.5 | 430° C., 6 h | 2.33 |
| Example 2 | 330° C., 20 h | 20.21 | 2.5 | 430° C., 6 h | 2.43 |
| Comp. Ex. 2 | 310° C., 20 h | 26.09 | 2.5 | 430° C., 6 h | 2.54 |

<XRD Measurement>

An X-ray diffraction (XRD) measurement using a CuKα ray was conducted to the intermediates and the active materials obtained in Examples 1 and 2 and Comparative Examples 1 and 2. As the result, it was confirmed that the silicon clathrate II type crystal phase was included as a main phase in every intermediate. Also, the results of the XRD measurement for the obtained active materials are shown in FIG. 4.

Figure 4:
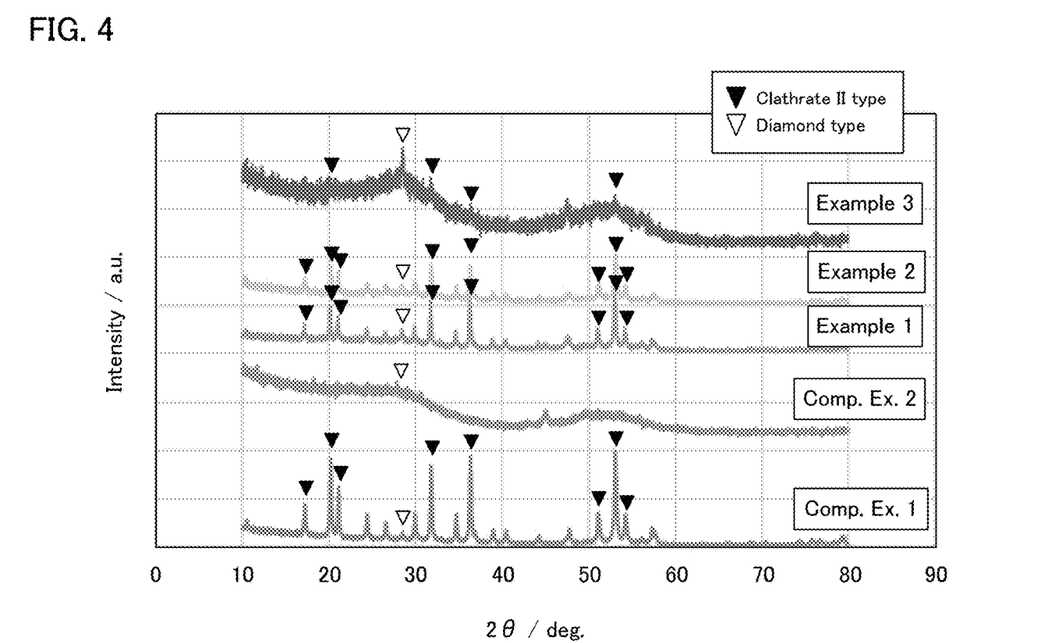
FIG. 4 is the result of an XRD measurement for the active materials obtained in Examples 1 and 2 and Comparative Examples 1 and 2.

As shown in FIG. 4, it was confirmed that, among the crystal phase, the silicon clathrate II type crystal phase was included as a main phase, and the diamond type Si crystal phase was included as a subphase in the active materials obtained in Examples 1 and 2 and Comparative Example 2. Meanwhile, the noncrystallinity of the active material obtained in Comparative Example 1 was extremely high, and among the crystal phases, it was confirmed that the active material included the diamond type Si crystal phase as the main phase, and the silicon clathrate II type crystal phase as the subphase.

Also, in the silicon clathrate II type crystal phase, the intensity of the peak "A" located at a position in the vicinity of 2θ=20.09° was regarded as $I_A$, the intensity of the peak "B" located at a position in the vicinity of 2θ=31.72° was regarded as $I_B$. Also, the maximum intensity in 2θ=22° to 23° was regarded as $I_M$, $I_A/I_M$ and $I_B/I_M$ were determined. The results are shown in Table 2.

<Confining Pressure Increase Measurement>

The confining pressure increase was measured by charging the all solid state batteries obtained in Examples 1 and 2 and Comparative Examples 1 and 2. The test conditions were the confining pressure (constant size) of 5 MPa, charging at 0.1 C, and cutoff voltage of 4.55 V. The confining pressure at 4.55 V was measured, and the confining pressure increase from the state before the charge was determined. The results are shown in Table 2. Incidentally, the results of the confining pressure increase in Table 2 are relative values when the result in Comparative Example 1 is regarded as 100.

TABLE 2

| | Active material composition x in $Na_xSi_{136}$ | $I_A/I_M$ | $I_B/I_M$ | Peak B 2 θ/deg | Confining pressure increase (relative value) |
|---|---|---|---|---|---|
| Comp. Ex. 1 | 1.98 | 1.02 | 1.03 | 31.76 | 100 |
| Example 1 | 2.33 | 1.25 | 1.06 | 31.69 | 96 |
| Example 2 | 2.43 | 1.77 | 1.42 | 31.65 | 80 |
| Comp. Ex. 2 | 2.54 | 1.60 | 1.38 | 31.60 | 138 |

As shown in Table 2, it was confirmed that the confining pressure increase in Examples 1 and 2 was lower compared to Comparative Example 1 and 2. The reason therefor is presumed that, because of the moderate presence of Na in the active material, the structural stability of the silicon clathrate II type crystal phase (particularly the cage) was improved. Incidentally, $I_A/I_M$ and $I_B/I_M$ were more than 1 in each of Examples 1 and 2 and Comparative Examples 1 and 2. Also, the influence of the structural stability of the crystal phase was also exhibited on the variation of the peak position of peak "B", and it was suggested that, when the peak position of peak "B" was 31.60°<2θ<31.69°, the confining pressure increase was decreased. Also, since Na included in the cage of the clathrate prevented Li intrusion when Si and Li were alloyed so as to suppress the collapse of the cage, the confining pressure increase was decreased by using the intermediate wherein Na was willingly remained.

Reference Example

Si particles and Na particles were mixed so as to be 1:1 in the molar ratio, projected into a melting pot, the pot was sealed under an Ar atmosphere, and heated at 700° C. so as to synthesize NaSi (Zintl compound). Then, under vacuum (approximately 1 Pa), Na was removed by heating at 340° C. so as to obtain an intermediate. The obtained intermediate and metal Li were weighed so as Li/Si=1 in molar ratio, and mixed in a mortar under an Ar atmosphere so as to obtain an alloy compound. By reacting the obtained alloy compound with ethanol under an Ar atmosphere, a void was formed inside a primary particle so as to obtain an active material. An anode was obtained in the same manner as in Example 1 except that the obtained active material was used.

Figure 5:
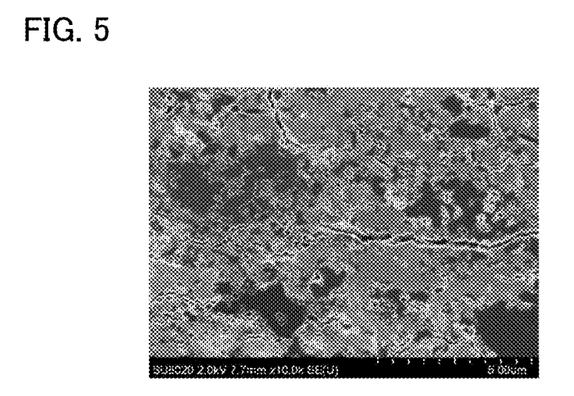
FIG. 5 is a cross-sectional SEM image of the anode layer (an anode layer after a roll press) obtained in Reference Example.

The cross-section of the obtained anode layer (anode layer after roll press) was observed with SEM. The result is shown in FIG. 5. In FIG. 5, the dark appearing parts corresponds to the active material, and it was confirmed that the nano-sized void was maintained even after the roll press. That is, it was suggested that the collapse of the void by the press was suppressed by the presence of the nano-sized void.

REFERENCE SIGNS LIST

1 . . . cathode layer
2 . . . anode layer
3 . . . electrolyte layer
4 . . . cathode current collector
5 . . . anode current collector
10 . . . battery

What is claimed is:

1. A method for producing an active material comprising a silicon clathrate II type crystal phase, and having a composition represented by $Na_xSi_{136}$, wherein 1.98<x<2.54, the method comprising:
a preparing step of preparing an intermediate including a silicon clathrate II type crystal phase and having a composition represented by $Na_ySi_{136}$, wherein 8≤y≤21,
an alloying step of obtaining an alloy compound by alloying the intermediate and a Li based material by mixing the intermediate and the Li based material,
a Li removing step of removing Li from the alloy compound by reacting the alloy compound with a Li extracting material, and obtaining a porous compound including a void inside a primary particle, and
a Na removing step of removing Na from the porous compound by a heat treatment.

2. A method for producing an anode layer, the method comprising:
an active material producing step of producing an active material by the method for producing an active material according to claim 1, and
an anode layer forming step of forming an anode layer by using the active material.

3. A method for producing a battery, the method comprising:
an active material producing step of producing an active material by the method for producing an active material according to claim 1, and
an anode layer forming step of forming an anode layer by using the active material.

4. The method for producing an active material according to claim 1,
wherein the "x" satisfies 2.30≤x≤2.50.

5. The method for producing an active material according to claim 1, wherein the Li based material includes at least one kind of a simple substance of Li, and a Li alloy.

6. The method for producing an active material according to claim 1, wherein a ratio (Li/Si) of Li included in the Li based material to Si included in the intermediate is 0.5 or more, and 3 or less.

7. The method for producing an active material according to claim 1, wherein the Li extracting material includes a liquid.

8. The method for producing an active material according to claim 1, wherein the Li extracting material includes at least one kind of a primary alcohol, a secondary alcohol, a tertiary alcohol, a phenolic, a glycol, a glycol ether, a pyranose, a furanose, a glucose, a fructose, a polysaccharide, and an acid.

9. The method for producing an active material according to claim 1, wherein the Li extracting material includes at least ethanol.

10. The method for producing an active material according to claim 1, wherein a temperature of the heat treatment is from 280° C. to 500° C.

11. The method for producing an active material according to claim 1, wherein a time of the heat treatment is from 1 hour to 50 hours or less.

12. The method for producing an active material according to claim 1, wherein a void ratio of the void is 4% or more, 40% or less.

13. The method for producing an active material according to claim 1, wherein, as peaks of the silicon clathrate II type crystal phase, peak "A" at a position of 2θ=20.09°±0.50° and peak "B" at a position of 2θ=31.72°±0.50° are observed in X-ray diffraction measurement using a CuKα ray, and
when an intensity of the peak "A" is regarded as $I_A$, an intensity of the peak "B" is regarded as $I_B$, and a maximum intensity in 2θ=22° to 23° is regarded as $I_M$, $I_A/I_M$ and $I_B/I_M$ are respectively more than 1.

14. The method for producing an active material according to claim 13, wherein the $I_A/I_M$ satisfies $1.02<I_A/I_M$ and the $I_B/I_M$ satisfies $1.03<I_B/I_M$.

\* \* \* \* \*